United States Patent
Paul

(10) Patent No.: US 10,557,408 B2
(45) Date of Patent: Feb. 11, 2020

(54) METHOD FOR PRODUCING A UNIT CONSISTING OF ECCENTRIC ROD AND PISTON OF A CONNECTING ROD OF AN INTERNAL COMBUSTION ENGINE

(71) Applicant: Dr. Ing. h.c. F. Porsche Aktiengesellschaft, Stuttgart (DE)

(72) Inventor: Michael Paul, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/037,135

(22) Filed: Jul. 17, 2018

(65) Prior Publication Data
US 2019/0024579 A1  Jan. 24, 2019

(30) Foreign Application Priority Data
Jul. 18, 2017 (DE) .................. 10 2017 116 122

(51) Int. Cl.
*F02B 75/04* (2006.01)
*F16C 7/06* (2006.01)
(Continued)

(52) U.S. Cl.
CPC ............ *F02B 75/045* (2013.01); *F02D 15/00* (2013.01); *F16C 7/06* (2013.01); *F16C 9/04* (2013.01);
(Continued)

(58) Field of Classification Search
CPC .... F02B 75/045; F16C 11/0685; F16C 23/10; F16C 9/04; F16C 7/06; F16C 2360/22;
(Continued)

(56) References Cited

U.S. PATENT DOCUMENTS

2016/0258479 A1  9/2016 Paul et al.
2016/0265448 A1* 9/2016 Kaufmann ................. F16J 1/22

FOREIGN PATENT DOCUMENTS

DE  10 2010 016 037  9/2011
DE  10 2015 103 207  9/2016
(Continued)

OTHER PUBLICATIONS

Japanese Office Action dated May 21, 2019.

*Primary Examiner* — Jacob M Amick
*Assistant Examiner* — Charles Brauch
(74) *Attorney, Agent, or Firm* — Gerald E. Hespos; Michael J. Porco; Matthew T. Hespos

(57) ABSTRACT

A method is provided for producing an assembly of an eccentric rod (15, 16) and a piston (20, 21) of a connecting rod of an internal combustion engine having an adjustable compression ratio. The method includes providing an eccentric rod (15, 16) having a first end (36, 37) for attachment to an eccentric lever of an eccentric adjusting device of the connecting rod and a second end (38, 39) for attachment to a piston (20, 21) that can be guided in a hydraulic chamber of the connecting rod. The method then includes arranging the second end (38, 39) of the eccentric rod (15, 16) in the piston (20, 21); introducing an injection-molding tool (47) into the piston (20, 21); and injection-molding a circumferentially closed retaining ring (43) between the piston (20, 21), the second end (38, 39) of the eccentric rod (15, 16) and the injection-molding tool (47).

2 Claims, 2 Drawing Sheets

(51) Int. Cl.
*F02D 15/00* (2006.01)
*F16C 9/04* (2006.01)
*F16C 23/10* (2006.01)
*F16C 11/06* (2006.01)
*B29K 71/00* (2006.01)
*B22D 19/16* (2006.01)
*B29K 21/00* (2006.01)
*F16K 31/52* (2006.01)

(52) U.S. Cl.
CPC .............. *F16C 23/10* (2013.01); *B22D 19/16* (2013.01); *B29K 2021/003* (2013.01); *B29K 2071/00* (2013.01); *F16C 11/0685* (2013.01); *F16C 2220/04* (2013.01); *F16C 2360/22* (2013.01); *F16K 31/52* (2013.01)

(58) Field of Classification Search
CPC ..... F16C 2220/04; F02D 15/00; B22D 19/16; B22D 19/12; F16K 31/52; B29K 2071/00; B29K 2021/003
See application file for complete search history.

(56) References Cited

FOREIGN PATENT DOCUMENTS

| | | | |
|---|---|---|---|
| EP | 3 067 576 | | 9/2016 |
| JP | 57-204371 | | 12/1982 |
| JP | S57204371 A | * | 12/1982 |
| JP | 2000-205240 | | 7/2000 |
| JP | 2011-220462 | | 11/2011 |

\* cited by examiner

METHOD FOR PRODUCING A UNIT CONSISTING OF ECCENTRIC ROD AND PISTON OF A CONNECTING ROD OF AN INTERNAL COMBUSTION ENGINE

CROSS REFERENCE TO RELATED APPLICATION

This application claims priority under 35 USC 119 to German Patent Appl. No. 10 2017 116 122.8 filed on Jul. 18, 2017, the entire disclosure of which is incorporated herein by reference.

BACKGROUND

Field of the Invention

The invention relates to a method for producing a unit of eccentric rod and piston of a connecting rod of an internal combustion engine having an adjustable compression ratio.

Related Art DE 10 2010 016 037 A1 and FIG. 1 herein show a connecting rod of an internal combustion engine having an adjustable compression ratio. The connecting rod 10 has a big end bearing eye 11 and a small end bearing eye 12. The big end bearing eye 11 is for attaching the connecting rod 10 to a crankshaft (not shown) and the small end bearing eye 12 is for attaching the connecting rod 10 to a cylinder piston (not shown). The connecting rod 10 is assigned an eccentric adjusting device 13 that has an eccentric, an eccentric lever 14 and eccentric rods 15, 16. The eccentric lever 14 has a bore with a center point 18. The bore is arranged eccentrically to a center point 17 of the small end bearing eye 12. The bore in the eccentric lever 14 receives the eccentric, and a bore in the eccentric receives a piston pin. The eccentric adjusting device 13 is used for adjusting an effective connecting rod length $l_{eff}$, with the connecting rod length being understood to be the distance separating the center point 18 of the bore in the eccentric lever 14 from a center point 19 of the big end bearing eye 11. The eccentric rods 15, 16 are displaceable to rotate the eccentric body 14 and to change the connecting rod length $l_{eff}$. Each eccentric rod 15, 16 is assigned a piston 20, 21 that is guided in a hydraulic chamber 22, 23. A hydraulic pressure prevails in the hydraulic chambers 22, 23 and acts on the pistons 20, 21 assigned to the eccentric rods 15, 16. Displacement of the eccentric rods is possible or not dependent on the amount of oil in the hydraulic chambers.

The adjustment of the eccentric adjusting device 13 is initiated by the action of inertia forces and load forces of the internal combustion engine that act on the eccentric adjusting device 13 during an operating cycle of the internal combustion engine. The action directions of the forces acting on the eccentric adjusting device 13 constantly change during an operating cycle. The adjusting movement is assisted by the pistons 20, 21 that are acted upon by hydraulic oil and that act on the eccentric rods 15, 16. The pistons 20, 21 prevent a resetting of the eccentric adjusting device 13 as a result of varying force action directions of the forces that act on the eccentric adjusting device 13. The eccentric rods 15, 16, which interact with the piston 20, 21, are attached to the eccentric body 14 on both sides. The hydraulic chambers 22 and 23 in which the pistons 20, 21 are guided can be supplied with hydraulic oil via hydraulic oil lines 24 and 25 from the big end bearing eye 11. Nonreturn valves 26 and 27 prevent a return flow of the hydraulic oil out of the hydraulic chambers 23 and 24 back into the hydraulic lines 24 and 25. A switching valve 29 is accommodated in a bore 28 of the connecting rod 10. The switching position of the switching valve 29 determines which of the hydraulic chambers 22 and 23 is filled with hydraulic oil and which of the hydraulic chambers 22 and 23 is emptied, with the adjusting direction or direction of rotation of the eccentric adjusting device 13 depending thereon. The fluid lines 30 and 31 connect the hydraulic chambers 22 and 23 with the bore 28 that accommodates the switching valve 29. As part of the switching valve 29, FIG. 1 schematically shows an actuating means 32, a spring device 33 and a control piston 34. The function of these components of the switching valve 29 already is known from DE 10 2010 016 037 A1.

As stated above, the hydraulic oil that acts on the pistons 20, 21 guided in the hydraulic chambers 22, 23 is fed via hydraulic lines 24 and 25 to the hydraulic chambers 22, 23 starting from the big end bearing eye 11. The connecting rod 10 acts on the crankshaft (not shown in FIG. 1) by way of the big end bearing eye 11 in such a way that a connecting rod bearing shell 35 is arranged between a crankshaft bearing pin of the crankshaft and the big end bearing eye.

As stated above, an eccentric rod 15, 16 is attached to the eccentric lever 14 on both sides of the eccentric lever 14. As can be gathered from FIG. 1, each of the eccentric rods 15, 16 acts by a first end 36 or 37 on the eccentric lever 14. Thus, the respective eccentric rod 15 or 16 acts by an opposite second end 38 or 39 on a piston 20 or 21 that is guided in the hydraulic chambers 22, 23 of the connecting rod 10.

According to practice, the eccentric rods 15, 16 are connected at both ends 36, 38 or 37, 39 to the eccentric lever 14 or the respective piston 20, 21 via connecting pins that ensure a hinge-like, articulated attachment of the eccentric rods 15, 16 to the eccentric lever 14 and to the pistons 20, 21. The use of such connecting pins for connecting the eccentric rods 15, 16 at their second ends 38, 39 to the pistons 20, 21 requires a high outlay on components and on manufacturing.

DE 10 2015 103 207 A1 discloses that the attachment of the eccentric rods 15, 16 in the region of their second ends 38, 39 to the pistons 20, 21 can be improved if the second ends of the eccentric rods 15, 16 are designed as ball heads. The ball heads engage in corresponding recesses of the respective piston 20, 21. The respective piston 20, 21 accommodates a retaining ring that bears partially on the ball head at the end of the respective eccentric rod 15, 16. The retaining ring can be closed in the circumferential direction.

EP 3 067 576 A1 shows that ends of eccentric rods that project into pistons can be ball heads secured in the piston via a retaining ring that is interrupted at its circumference. The retaining ring engages behind an undercut in the piston.

Accordingly, it is known from the prior art for an end of an eccentric rod that is inserted into a piston which, in the mounted state of the connecting rod, is guided in a hydraulic chamber of the connecting rod to be configured as a ball head and to be retained in the piston via a closed retaining ring.

However, difficulties have been posed in simply and reliably producing a unit consisting of eccentric rod and piston in which the eccentric rod is secured in the piston via a closed retaining ring.

It is an object of the invention to provide a connecting rod of an internal combustion engine having an adjustable compression ratio where an eccentric rod is secured simply and reliably in a piston via a closed retaining ring.

SUMMARY

The invention relates to a method that comprises providing an eccentric rod having a first end to be attached to an eccentric lever of an eccentric adjusting device of a connecting rod and a second end to be attached to a piston, which, in the mounted state of the connecting rod, is guided in a hydraulic chamber of the connecting rod. The method also includes providing the piston, which, in the mounted state of the connecting rod, is guided in a hydraulic chamber of the connecting rod. The method then includes arranging the second end of the eccentric rod in the piston. The method further includes introducing an injection-molding tool into the piston; injection-molding a circumferentially closed retaining ring between the piston, the second end of the eccentric rod and the injection-molding tool; and removing the injection-molding tool.

This method simply and reliably produces the assembly of the piston and eccentric rod that engages in the piston by one end and is secured in the piston at this end via a closed retaining ring.

The second end of the eccentric rod is designed as a ball head that is inserted partially into a ball shell segment in the piston. The injection-molding tool is placed on a portion of the ball head that projects out of the ball shell segment of the piston, and the circumferentially closed retaining ring is formed between the piston, the portion of the ball head that projects out of the ball shell segment of the piston, and the injection-molding tool. Consequently, the assembly of the piston and eccentric rod can be produced in a particularly advantageous manner.

The injection-molding tool may be placed on the portion of the ball head that projects out of the ball shell segment of the piston in such a way that the ball head is pressed against the ball shell segment. The ball head together with the injection-molding tool then is displaced in a defined manner relative to the piston to set a defined gap between the ball head and ball shell segment. The circumferentially closed retaining ring then is formed by injection-molding between the piston, the portion of the ball head that projects out of the ball shell segment of the piston, and the injection-molding tool. The defined gap between the ball head and ball shell segment may be set so that no injection-molding material enters this gap during injection-molding. These details also serve for the particularly advantageous, simple and reliable production of the assembly of the eccentric rod and piston. The defined gap can ensure a good articulated attachment of the eccentric rod to the piston.

Exemplary embodiments of the invention are explained in more detail with reference to the drawing without being restricted thereto.

DETAILED DESCRIPTION

Figure 1:
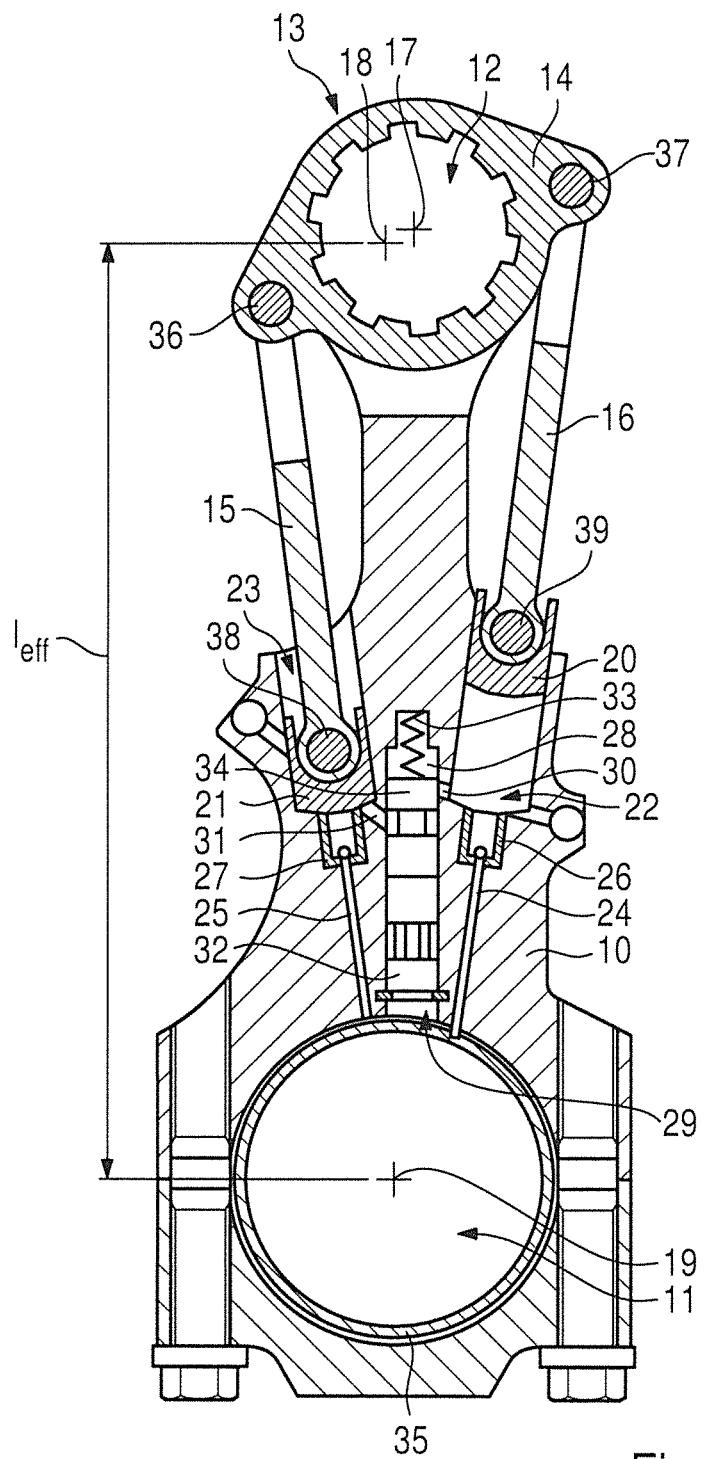
FIG. 1 shows a connecting rod of an internal combustion engine known from the prior art having an adjustable compression ratio.

An internal combustion engine with an adjustable compression ratio has at least one, preferably a plurality of, cylinder(s). Each cylinder has a piston that is coupled to a crankshaft of the internal combustion engine by a connecting rod 10.

Each connecting rod 10 has a small end bearing eye 12 at one end and a big end bearing eye 11 at an opposite end. The respective connecting rod 10 acts by way of its big end bearing eye 11 on a crankshaft bearing pin of the crankshaft in such a way that a connecting rod bearing shell is positioned between the crankshaft bearing pin and the big end bearing eye, with a lubricating oil film being able to build up between the connecting rod bearing shell and the crankshaft bearing pin.

An internal combustion engine with an adjustable compression ratio has, in the region of each connecting rod 10, an eccentric adjusting device 13 for adjusting the effective connecting rod length of the respective connecting rod 10.

The eccentric adjusting device 13 has an eccentric, an eccentric lever 14 and eccentric rods 15, 16 that can be displaced to adjust the compression ratio in dependence on a hydraulic pressure that prevails in hydraulic chambers interacting with the eccentric rods. The hydraulic chambers interacting with the eccentric rods 15, 16 can be supplied with hydraulic oil starting from the big end bearing eye 11 of the respective connecting rod.

The adjustment of the eccentric adjusting device 13 is initiated by the action of inertia forces and load forces of the internal combustion engine.

The eccentric rods 15, 16 act by first ends 36, 37 on the eccentric lever 14. Eccentric rods 15, 16 are fastened by opposite second ends 38, 39 to the respective piston 20, 21 that is guided in a respective hydraulic chamber 22, 23 of the connecting rod 10.

Figure 2:
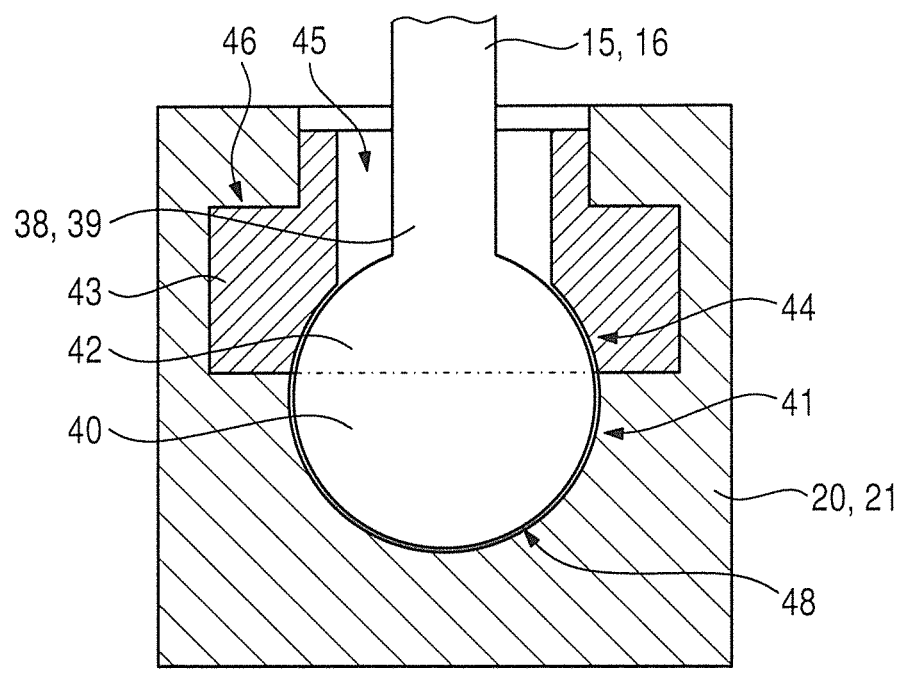
FIG. 2 shows a detail of a first connecting rod according to the invention.

FIG. 2 shows a detail of an eccentric rod 15, 16 in the region of a second end 38, 39 of the respective eccentric rod 15, 16, with the respective eccentric rods 15, 16 being designed as a ball head in the region of these second ends 38, 39.

This second end 38, 39 of the respective eccentric rod 15, 16 that is designed as a ball head projects by a first portion 40 into a corresponding ball shell segment 41 of the respective piston 20, 21 and projects by a portion 42 out of this ball shell segment 41.

The second end 38, 39 of the respective eccentric rod 15, 16 is secured in the respective piston 20, 21 via a circumferentially closed retaining ring 43 that forms a type of ball shell segment 44 against which there bears the portion 42 of the ball head that projects out of the ball shell segment 41 of the respective piston 20, 21. As already stated, this retaining ring 43 is closed in the circumferential direction and has a central aperture 45 through which the eccentric rod 15, 16 extends. As shown in FIG. 2, the circumferentially closed retaining ring 43 engages behind an undercut 46 in the respective piston 20, 21, with the result that the second end 38, 39 of the respective eccentric rod 15, 16 is captively guided in the respective piston 20, 21 via the respective closed retaining ring 43.

The invention therefore relates to a method for simply and reliably producing such an assembly of an eccentric rod 15, 16 and a piston 20, 21 acting on the second end 38, 39 of the eccentric rod 15, 16, together with a closed retaining ring 43.

For this purpose, there is first provided the respective eccentric rod 15 with first and second ends 36, 37 and the eccentric rod 16 with first and second ends 38, 39. The respective first ends 36, 37 of the eccentric rod 15, 16 attach to the eccentric lever 14, and the respective second ends 38, 39 attach to the respective piston 20, 21.

The pistons 20, 21, in the mounted state of the connecting rods, are guided in hydraulic chambers 22, 23 thereof.

In addition to the respective eccentric rod 15, 16, the respective piston 20, 21s also is provided.

The second end 38, 39 of each of the eccentric rods 15, 16 is a ball head arranged in the respective piston 20, 21 so that the ball head of the eccentric rod 15, 16 has a portion 40 that projects into a ball shell segment 41 of the respective piston 20, 21. A portion 42 of the ball head that adjoins the portion 40 of the ball head that projects into the ball shell segment 41 projects out of the ball shell segment 41 of the respective piston 20, 21.

Figure 3:
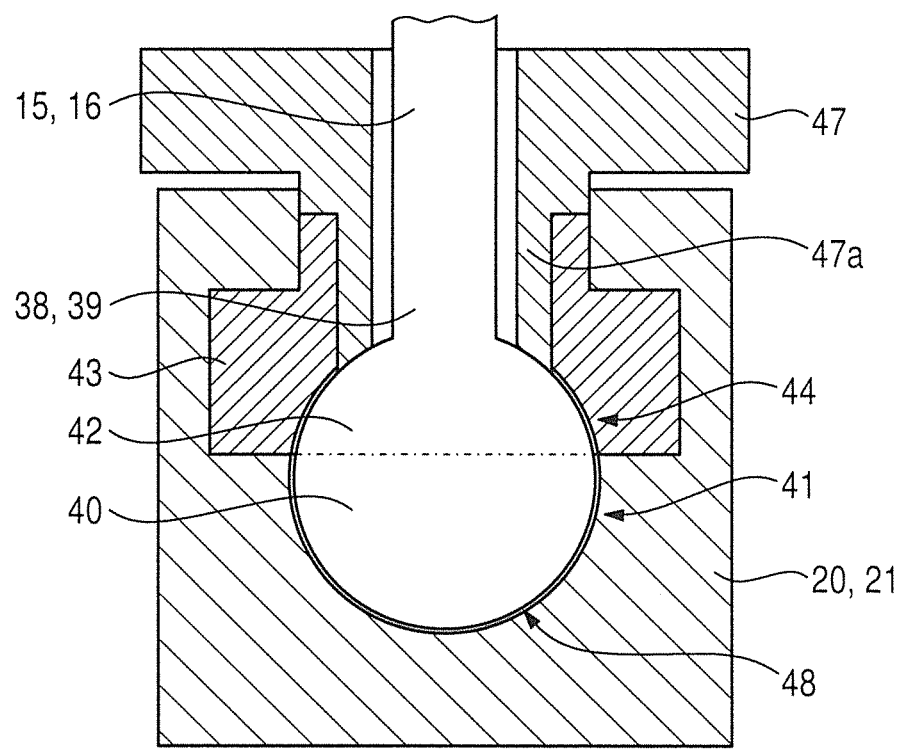
FIG. 3 shows the detail of FIG. 2 during the production thereof.

Subsequent to arranging the respective second end 38, 39 of the eccentric rod 15, 16 in the respective piston 20, 21, an injection-molding tool 47 (see FIG. 3) is introduced partially into the respective piston 20, 21, with a portion 47a of the injection-molding tool 47 that projects into the piston 20, 21 pressing against the portion 42 of the ball head that projects out of the ball shell segment 41 of the second end 38, 39 of the eccentric rod 15, 16.

After arranging the injection-molding tool 47 with the portion 47a in the piston 20, 21, the circumferentially closed retaining ring 43 is formed by injection-molding with the aid of the injection-molding tool 47.

The injection-molding tool 47 then is removed from the piston 20, 21.

During injection-molding, the circumferentially closed retaining ring 43 is formed between the portion 42 that projects out of the ball shell segment 41 of the piston 20, 21 of the respective second end 38, 39 of the eccentric rod 15, 16 and the piston 20, 21 and the injection-molding tool 47. A clearance between the portion 47a of the injection-molding tool 47 that projects into the piston 20, 21, the piston 20, 21 and the portion 42 of the second end 38, 39 of the eccentric rod 15, 16 that is designed as a ball head, is filled with injection-molding material to form the circumferentially closed retaining ring 43 with engagement behind the undercut 46 of the piston 20, 21. The circumferentially closed retaining ring 43 then is accommodated captively in the piston 20, 21 and thus also captively retains the piston 20, 21 on the second end 38, 39 of the eccentric rod 15, 16.

The portion 47a of the injection-molding tool 47 is placed on the portion 42, that projects out of the ball shell segment 41 of the piston 20, 21, of the second end 38, 39 of the respective eccentric rod 15, 16 that is designed as a ball head in such a way that the ball head at the second end 38, 39 of the eccentric rod 15, 16 presses by way of the portion 40 against the ball shell segment 41 of the piston 20, 21. The ball head at the second end 38, 39 of the eccentric rod 15, 16 together with the portion 47a of the injection-molding tool 47 then are displaced relative to the piston 20, 21 in a defined manner to set a defined gap 48 between the ball head at the second end 38, 39 of the eccentric rod 15, 16 and the ball shell segment 41 of the piston 20, 21. This gap 48 is set and dimensioned so that no injection-molding material enters the gap 48 during injection-molding. After setting this defined gap 48, the circumferentially closed retaining ring 43 is formed by injection-molding, namely by filling the cavity between the portion 47a of the injection-molding tool 47, the piston 20, 21 and the portion 42 of the ball head with injection-molding material, with the gap 48 not being filled by injection-molding material. As a result, after injection-molding the circumferentially closed retaining ring 43, the gap 48 ensures a good articulated attachment of the second end 38, 39 of the eccentric rod 15, 16 to the respective piston 20, 21.

A thermoplastic such as polyether ether ketone preferably is used as injection-molding material.

What is claimed is:

1. A method for producing an assembly that includes an eccentric rod and a piston of a connecting rod of an internal combustion engine that has an adjustable compression ratio, the method comprising:
   providing the eccentric rod having a first end for attachment to an eccentric lever of an eccentric adjusting device of the connecting rod and a second end in the form of a ball head for attachment to a piston having a ball shell segment, the piston configured to be guided in a hydraulic chamber of the connecting rod;
   providing the piston which, in the mounted state of the connecting rod, is guided in the hydraulic chamber of the connecting rod;
   arranging the ball head of the eccentric rod partially into the ball shell segment of the piston;
   introducing an injection-molding tool into the piston by placing the injection-molding tool on a portion of the ball head of the eccentric rod that projects out of the ball shell segment so that the ball head is pressed against the ball shell segment;
   displacing at least one of the ball head and the injection molding tool in a defined manner relative to the piston to set a defined gap between the ball head and the ball shell segment;
   injection-molding a circumferentially closed retaining ring between the piston, the portion of the ball head of the eccentric rod projecting out of the piston and the injection-molding tool; and
   removing the injection-molding tool.

2. The method as claimed in claim 1, wherein the defined gap between a portion of the ball head that projects into the ball shell segment of the piston and the ball shell segment is set so that no injection-molding material enters this gap during injection-molding.

* * * * *